United States Patent Office 2,958,667
Patented Nov. 1, 1960

2,958,667

PRODUCING HALOGENATED RUBBERY COPOLYMERS UTILIZING THE ALKALINE EARTH METAL SALT OF A FATTY ACID AS A STABILIZER

Lawrence T. Eby, Rahway, Delmer L. Cottle, Highland Park, and Theodore Lemiszka, Linden, N.J., assignors to Esso Research and Engineering Company, a corporation of Delaware No Drawing. Filed Feb. 27, 1957, Ser. No. 642,675

17 Claims. (Cl. 260—23.7)

This invention relates to improved methods of processing, for product recovery, halogenated rubbery copolymerization products of isoolefins and multiolefins, and particularly to recovering chlorinated or brominated butyl rubber from the solution in which it was halogenated by the use of aqueous media containing certain organic alkaline earth metal salts.

Butyl rubber is essentially a vulcanizable rubbery hydrocarbon copolymer containing about 85 to 99.5 weight percent, preferably about 95 to 99.5 weight percent of a $C_4$ to $C_8$ isoolefin such as 2-methyl-1-butene, 3-methyl-1-butene, or especially isobutylene, the remainder being a $C_4$ to $C_{14}$ multiolefin, preferably a $C_4$ to $C_6$ conjugated diolefin such as butadiene, dimethyl butadiene, piperylene, or such multiolefins as vinyl fulvenes, cyclopentadiene, cyclohexadiene, or especially isoprene. The resulting rubbery copolymer has a Staudinger molecular weight of about 20,000 to 300,000, and a mole percent unsaturation of between about 0.5 to 15.0. The preparation of such a copolymer, known in the art as butyl rubber, is described in U.S. Patent 2,356,128 to Thomas et al., and also in other patents as well as in the literature.

Halogenated butyl rubber is advantageously produced by the controlled halogenation of a solution of the unculcanized hydrocarbon rubbery copolymer. The hydrocarbon copolymer, which is produced in a reaction zone at a temperature level of between about $-80°$ and $-165°$ C., is in the form of a slurry suspended in about 1 to 10 volumes of a $C_1$ to $C_3$ alkyl halide diluent. This slurry is then caused to flow into a flash drum where it is contacted with a hot inert solvent, such as a $C_5$ to $C_{10}$ hydrocarbon, which drives off volatile materials such as the alkyl halide and dissolves the butyl rubber in the solvent. The butyl rubber is then halogenated while dissolved in the solvent, the halogenated butyl rubber containing-solution formed being subsequenlty contacted with steam and hot water to slurry the resulting halogenated butyl rubber in aqueous suspension. The halogenated butyl rubber is then recovered by dewatering and degassing extrusion or the like wherein the finishing temperatures are advantageously regulated to a level of between about 100° and 175° C.

One of the major problems of handling such halogenated rubbery copolymers in aqueous suspension is the agglomeration of halogenated copolymer particles into large lumps or masses that cannot be pumped through lines or otherwise conveniently processed. It has been proposed in the prior art to correct this insufficiency by the addition to the aqueous suspension of zinc stearate as a slurry aid. However, this method has not been entirely satisfactory since zinc stearate, which appears in the finished product, tends to cause scorching and excessive prevulcanization during subsequent finishing, compounding, and curing. It has also bee proposed to substitute for zinc stearate a group II metal silicate such as calcium silicate; however, this has not materially decreased scorching, and such metal silicates have proven to be relatively ineffective slurrying aids.

According to the present invention, the foregoing difficulties are overcome, and halogenated butyl rubbers of improved molecular weight, stability, low gel content, and high tear strength are produced by slurrying the halogenated butyl rubber from solution, into a zinc stearate-free medium heated to a temperature level of between about 100° to 200° F. (e.g. about 35° to 95° C.) and preferably at about 140° to 170° F. (e.g. about 60° to 70° C.), containing about 0.01 to 10.0, advantageously about 0.05 to 7.0, and preferably about 0.1 to 5.0 weight percent of a slurry aid which is an alkaline earth metal salt of a $C_5$ to $C_{30}$ monocarboxylic fatty acid. The preferred slurrying aids are $C_{10}$ to $C_{22}$ calcium, magnesium, or barium, naphthenates, oleates, linoleates, ricinoleates, palmitates or especially stearates.

Although it is preferred to add substantially all of the alkaline earth metal organic salt to the hot aqueous medium as described above, it is also within the purview of the present invention to add substantial amounts of such organic salts during compounding because of their stabilizing advantages. Also, if desired, there may be added to the hot aqueous medium about 0.01 to 1.0 weight percent or more of such polyoxyalkylene compounds as mono-fatty rosin-acid esters of polyethylene glycols, alkyl phenoxy-polyoxyethylene glycols and/or aliphatic polyoxyethylene ethers or the like.

In preparing a typical butyl rubber copolymer, 98 parts by weight of isobutylene are mixed with about 2 parts by weight of isoprene and about 400 parts by weight of methyl chloride. This mixture is cooled to a temperature of about $-103°$ C. and then copolymerized by the addition thereto of about 0.05 to 1.0 weight percent (e.g. 0.5 weight percent) based on monomers of a Friedel-Crafts catalyst, preferably an aluminum halide, such as aluminum chloride, dissolved in a $C_1$ to $C_3$ alkyl halide such as methyl chloride. Powerful and efficient stirring and agitation are desirable to disperse the catalyst into the cold olefinic materials.

The copolymerization proceeds rapidly to yield the desired copolymer which precipitates out from the solution in the form of a particulate white solid having many of the physical characteristics of raw gum rubber. The cold methyl chloride-butyl rubber slurry is then preferably discharged into a flash drum where it is contacted, at a temperature level of about 120° to 150° F., with an inert solvent such as a $C_5$ to $C_{10}$ hydrocarbon (e.g. hexane, benzene, or the like) which drives off the methyl chloride and dissolves the butyl rubber.

The foregoing solution of butyl rubber in the inert solvent is then contacted at a temperature level of about 0° to about 100° C. with such halogenating agents as gaseous chlorine, liquid bromine, or sulfuryl chloride at room temperature or with N-chlorosuccinimide; N,N'-dichloro-5,5-dimethyl hydantoin or the like. The halogenation is carried out so as to make the resulting halogenated butyl rubber contain at least about 0.5 weight percent halogen, preferably at least about 1.0 weight percent halogen, but not more than a halogen content of about 3.0 "X" weight percent (in the case of bromine) and not more than a halogen content of about 1.0 "X" weight percent (in the case of chlorine) wherein:

$$X = \frac{M_3 L}{(100-L)M_1 + L(M_2+M_3)} \times 100$$

and $L$ = mole percent of the multiolefin in the polymer
$M_1$ = molecular weight of the isoolefin
$M_2$ = molecular weight of the multiolefin
$M_3$ = atomic weight of chlorine or bromine.

Restated, the polymer should have a halogen content of at least about 0.5 weight percent, but not more than about 1 atom of chlorine or 3 atoms of bromine per double bond in the copolymer.

The resulting solution of halogenated butyl rubber is then contacted with steam to flash off the solvent, unpolymerized olefins (if any) etc. and slurried in hot water, containing in accordance with the present invention, an organic alkaline earth metal salt optionally along with about 0.05 to 1.0 part by weight, preferably about 0.1 to 0.5 part by weight (per 100 parts by weight of halogenated copolymer) of such antioxidants as N-lauroyl para amino phenol, ditertiary butyl para cresol, bisphenols, phenyl beta naphthylamine, etc. The halogenated butyl rubber is then recovered by degassing extrusion, filtration, drying or the like. The resulting halogenated butyl rubber as recovered generally has a mole percent unsaturation of between about 0.5 and 15.0, and a Staudinger molecular weight of 20,000 to 300,000.

The details and advantages of the present invention will be better understood from a consideration of the following experimental data:

850 pounds of a methyl chloride-containing butyl rubber (97.5% isobutylene and 2.5% isoprene) slurry having a temperature of −140° F. (i.e. −95° C.) in a reactor was continuously over-flowed into a flash drum where it was contacted with 1530 lbs. of benzene. The flash drum was regulated to a temperature level of 60° C. (i.e. 140° F.) so as to flash overhead substantially all of the methyl chloride and unreacted monomers and form a solution of butyl rubber in benzene. This solution was continuously fed to a 500-gallon glass-lined Pfaudler reactor equipped with an agitator, baffle, submerged stainless steel sparger ring and a conduit leading into the ring.

Gaseous chlorine was then continuously added to the butyl rubber solution over a period of ½ hour at a temperature level of 29° C. and under atmospheric pressure. The chlorine was added to the reactor through the conduit via the sparger ring. The chlorination was then terminated and the solution containing the chlorinated butyl rubber formed, agitated for an additional 10 minutes. The resulting solution of chlorinated butyl rubber was then water washed three times to remove dissolved hydrogen chloride. There was then added to the solution, 0.2 lb. (per 100 lbs. of chlorinated butyl rubber) of a 10 weight percent solution in benzene of the anti-oxidant 2,6-ditertiary butyl para cresol.

The resulting water-washed benzene solution of chlorinated butyl rubber, was then injected into a flash drum along with 800 lbs. of steam having a temperature of about 300° F. and a pressure of 60 p.s.i.g. together with 4,000 lbs. of hot water having a temperature of 150° F. to 190° F. (i.e. 66° to 88° C.) and containing 0.05 weight percent of calcium stearate as a slurrying aid. This flashed off the benzene solvent and formed an aqueous slurry of the chlorinated butyl rubber in water.

The chlorinated butyl rubber slurry did not tend to coagulate and was readily processed by pumping through various lines of auxiliary equipment. The water in the chlorinated butyl rubber slurry was then removed by dewatering on a filter at 180° F. (i.e. 82° C.) for 0.6 minute. The chlorinated butyl rubber which was then in the form of a "wet crumb" was then dried at 250° F. (i.e. 120° C.) for 20 minutes and compacted by milling for 7 minutes on a rubber mill having a roll temperature of 260° F. (i.e. 127° C.). The Mooney viscosity (8 minutes at 212° F.) for the chlorinated copolymer formed was found to be 67 and the viscosity average molecular weight was 435,000. The chlorinated butyl rubber was also found to contain 1.30 weight percent combined chlorine. Upon subsequent compounding of 100 parts by weight of the chlorinated copolymer with 50 parts by weight of SRF carbon black and 1.0 part by weight of stearic acid, the compounded chlorinated butyl rubber formed did not appreciably cross link or gel upon milling for 30 minutes at 285° F.

*Example II*

The same general procedure as in Example I was repeated employing two different concentrations, i.e., 2 and 5 parts by weight (per 100 parts by weight of chlorinated butyl rubber) of calcium stearate compared to the same concentrations of zinc stearate. The results were as follows:

| Sample | Parts by weight (grams) | | | |
|---|---|---|---|---|
| | A | B | C | D |
| Component: | | | | |
| Chlorinated butyl rubber | 100 | 100 | 100 | 100. |
| Calcium stearate | 2 | 5 | | |
| Zinc Stearate | | | 2 | 5. |
| Corrosion of tinplate after 30 minutes at 300° F. | very slight. | none | severe | extreme. |
| Viscosity average molecular weight after 30 mins. at 300° F. | 431,000 | 364,000 | 115,000 | 30,000. |

The above data indicate that chlorinated butyl rubber containing calcium stearate is stabilized against dehydrohalogenation as shown by very slight or no corrosion of tinplate at 300° F. for 30 minutes but that the presence of zinc stearate does not cause such stabilization. The data also show that calcium stearate does not degrade the molecular weight of chlorinated butyl rubber whereas zinc stearate causes the molecular weight to be drastically lowered upon heating for 30 minutes at 300° F.

*Example III*

The same general procedure as in Example II was repeated using 1 part by weight of calcium stearate or zinc stearate per 100 parts by weight of chlorinated butyl rubber. Both samples were then tested for gel content after heating for 30 minutes at 300° F. The results were as follows:

| Sample | Parts by weight (grams) | |
|---|---|---|
| | E | F |
| Component: | | |
| Chlorinated butyl rubber | 100 | 100 |
| Calcium stearate | 1 | |
| Zinc stearate | | 1 |
| Gel content (weight percent) (in diisobutylene) | 0 | 52 |

The above data show that the presence of zinc stearate cross links or gels chlorinated butyl rubber at 300° F. whereas calcium stearate does not.

*Example IV*

The same general procedure as in Example III was repeated employing a chlorinated butyl rubber containing 1.3 weight percent chlorine and having a viscosity average molecular weight of 330,000. The molecular weight and weight percent gel for various drying times were as follows:

| Drying Time (Hours at 215° F.) | Chlorinated Butyl Rubber plus 1% Zinc Stearate | | | | Chlorinated Butyl Rubber plus 1% Calcium Stearate | | | |
|---|---|---|---|---|---|---|---|---|
| | Water, wt. percent | Chlorine, wt. percent | Mol. wt. | Percent Gel | Water, wt. percent | Chlorine, wt. percent | Mol. wt. | Percent Gel |
| 1.00 | | 1.2 | | 0 | 0.3 | 1.2 | 310,000 | 0 |
| 1.25 | 0.2 | 1.3 | 300,000 | 0 | | | | |
| 1.50 | 0.3 | 1.3 | 40,000 | 61 | | | | |
| 2.00 | 0.2 | 1.0 | 37,000 | 65 | 0.4 | 1.2 | 315,000 | 0 |
| 3.00 | 0.2 | 1.6 | 3,200 | 88 | | | | |
| 4.00 | 0.1 | 1.5 | 3,200 | 87 | 0.4 | 1.4 | 325,000 | 0 |
| 8.00 | | | | | 0.5 | 1.4 | 305,000 | 0 |

The above data show that calcium stearate stabilizes chlorinated butyl rubber against molecular weight degradation and gel formation at 215° F. whereas zinc stearate does not.

*Example V*

Another run was made chlorinating butyl rubber. The butyl rubber employed was a commercial butyl rubber produced by employing in the polymerization feed about 2.5 weight percent isoprene and about 97.5% isobutylene. The rubber had a Mooney viscosity (8 minutes at 212° F.) of 71.0, a mole percent unsaturation of 1.47, and a viscosity average molecular weight of 420,000.

The chlorination of a 15 weight percent solution of 15 pounds, 7 ounces of butyl rubber was conducted in a 50-gallon glass-lined Pfaudler reactor equipped with agitator and baffle.

The solvent for the butyl rubber was an aluminum chloride treated hydrocarbon stream having the following composition:

Component: Volume percent
 2,2-dimethylbutane _____ 0.1
 2,3-dimethylbutane _____ 2.40
 2-methylpentane _____ 10.75
 3-methylpentane _____ 12.45
 n-Hexane _____ 44.85
 Methylcyclopentane _____ 20.5
 2,2-dimethylpentane _____ 0.4
 Benzene _____ 7.7
 Cyclohexane _____ 0.85

Gaseous chlorine, in an amount of 2.8 weight percent based on butyl rubber, was continuously added to the butyl rubber solution over a period of 10 minutes at 30° C. and under atmospheric pressure. The chlorine was added to the reactor through a ⅜ inch stainless steel tube, one end of which was immersed below the liquid level of the agitated butyl rubber solution. The agitated solution was allowed to stand for an additional 20 minutes and then washed three times with equal volumes of water. Four samples of the resulting solution were then each slurried with 161 pounds of 300° F. steam and 465 pounds of water heated to a temperature of 165° F. The water contained various amounts of calcium stearate as indicated hereinafter. In each sample the solution was maintained at a temperature between about 160° and 170° F. whereby to flash off the hydrocarbon solvent and form an aqueous slurry of the chlorinated butyl rubber in water. Each slurry was then filtered and the chlorinated butyl which was in the form of a wet "crumb" was placed in a Proctor-Schwartz tray drier maintained at 210° F. and dried for 40 minutes. The crumb depth on the tray was about ½ inch. The crumb was completely dried and compacted by milling for eight minutes on a conventional rubber mill having a roll temperature of 250° F. One hundred parts by weight of the four samples were then each compounded with 50 parts by weight of HAF carbon black, 5.0 parts by weight of zinc oxide, and with the additional materials listed hereinafter. Each sample was then cured at 307° F. for 45 minutes, the resulting tear strengths in pounds per inch for cured knotched dumbbells being as follows:

| | Sample G | Sample H | Sample I | Sample J | Sample K | Sample L | Sample M | Sample N | Sample O | Sample P | Sample Q | Sample R |
|---|---|---|---|---|---|---|---|---|---|---|---|---|
| Grams of calcium stearate per gram of chlorinated butyl rubber | 0.024 | 0.020 | 0.010 | 0.005 | 0.024 | 0.020 | 0.010 | 0.005 | 0.024 | 0.020 | 0.010 | 0.005 |
| Parts by weight of sulfur | | | | | 2.0 | 2.0 | 2.0 | 2.0 | 2.0 | 2.0 | 2.0 | 2.0 |
| Parts by weight of tetramethyl thiuram disulfide | 1.0 | 1.0 | 1.0 | 1.0 | | | | | 0.5 | 0.5 | 0.5 | 0.5 |
| Parts by weight of tellurium diethyl dithiocarbamate | | | | | 1.0 | 1.0 | 1.0 | 1.0 | | | | |
| Parts by weight of benzothiazyl disulfide | | | | | | | | | 0.25 | 0.25 | 0.25 | 0.25 |
| Parts by weight of stearic acid | 1.0 | 1.0 | 1.0 | 1.0 | 0.5 | 0.5 | 0.5 | 0.5 | 0.5 | 0.5 | 0.5 | 0.5 |
| Parts by weight of antioxidant, i.e., 2,2'-methylene bis(4-methyl-6-tertiary butyl phenol) | 1.0 | 1.0 | 1.0 | 1.0 | | | | | | | | |
| Tear strength of knotched dumbbell (pounds/inch) | 203 | 179 | 147 | 154 | 238 | 225 | 215 | 209 | 289 | 232 | 220 | 207 |

The above data show that in general the tear strength decreases as the amount of calcium stearate in the chlorinated butyl rubber decreases.

*Example VI*

The same general procedure as in Example V was repeated substituting 5 weight percent of added liquid bromine (based on butyl rubber) for gaseous chlorine. A control containing no metal stearate was compared to a composition containing zinc stearate and also to compositions containing magnesium, calcium, and barium stearates, respectively. The amount of metal stearate, when employed, was 1 part by weight per 100 parts by weight of brominated butyl rubber. All samples were compounded, per 100 parts by weight of brominated butyl rubber, with 5 parts by weight of zinc oxide, 50 parts by weight of SRF carbon black and 1.0 part of stearic acid. The Mooney scorch at 260° F. for a 10-point rise above the minimum, and the physical inspections of 6 x 6 x 0.075 inch pads cured for 60 minutes at 307° F. were as follows:

| Metal Stearate added | None | Zn | Mg | Ca | Ba | Al |
|---|---|---|---|---|---|---|
| Mooney scorch at 260° F | 11 | 8 | 19 | 21 | 21 | 12 |
| Shore "A" hardness | 47 | 47 | 47 | 47 | 47 | 49 |
| Tensile strength (p.s.i.) | 1,640 | 1,580 | 1,590 | 1,680 | 1,580 | 1,630 |
| Elongation (percent) | 560 | 550 | 560 | 570 | 490 | 520 |
| Modulus at: | | | | | | |
| 100% Elong | 170 | 170 | 160 | 170 | 180 | 180 |
| 200% Elong | 520 | 480 | 420 | 480 | 510 | 480 |
| 300% Elong | 970 | 880 | 840 | 920 | 1,020 | 950 |
| 400% Elong | 1,300 | 1,250 | 1,240 | 1,300 | 1,400 | 1,350 |

The above data show that the stearates of magnesium, calcium, and barium effectively improve the Mooney scorch of brominated butyl rubber without adversely affecting stress-strain properties whereas zinc stearate impairs the Mooney scorch of brominated butyl rubber and aluminum stearate gives substantially no improvement in scorch characteristics.

Example VII

The same general procedure as in Example V was again repeated employing a chlorinated butyl rubber containing 1.3 weight percent chlorine and having a viscosity average molecular weight of 360,000. In sample S 1.7 weight percent of zinc stearate was added to the chlorinated rubber whereas in sample T 1.7 weight percent of calcium stearate was added. Both samples were hot milled at three different temperature levels for 5 minutes, the viscosity average molecular weights in diisobutylene of each sample being as follows:

| Hot milling temperature | Molecular weight | |
|---|---|---|
| | Sample S | Sample T |
| Slurrying aid added | Zinc Stearate | Calcium Stearate |
| 250° F | Gelled | 360,000 |
| 275° F | Gelled | 360,000 |
| 300° F | Gelled | 360,000 |

The above data show that calcium stearate susbtantially precludes molecular weight breakdown of chlorinated butyl rubber during hot milling whereas zinc stearate does not.

Example VIII

The same general procedure as in Example VII was repeated, sample V containing zinc stearate and sample U containing calcium stearate. Both samples were then compounded, per 100 parts by weight of chlorinated rubber, with 50 parts by weight of HAF carbon black, 5.0 parts by weight of zinc oxide, and with the additional materials listed hereinafter. Each sample was then tested for Mooney scorch time at 260° F., the time being recorded for a 10 point rise above the minimum. The results were as follows:

| Component | Parts by weight | | | |
|---|---|---|---|---|
| | Sample U | Sample V | Sample U | Sample V |
| Slurrying aid added | Calcium Stearate | Zinc Stearate | Calcium Stearate | Zinc Stearate |
| Tetramethyl thiuram disulfide | 1.0 | 1.0 | 0.50 | 0.50 |
| Benzothiazyl disulfide | | | 0.25 | 0.25 |
| Stearic acid | 1.0 | 1.0 | 0.50 | 0.50 |
| Sulfur | | | 2.0 | 2.0 |
| Mooney scorch time (minutes) | 26 | 8 | 23 | 9 |

The above data show that calcium stearate improves the scorch resistance of chlorinated butyl rubber but that zinc stearate does not.

Example IX

The same general procedure as in Example VIII was repeated except that the control sample contained no zinc stearate, samples W and X containing 1.0 weight percent of added calcium oleate and calcium naphthenate respectively. One hundred parts by weight of each sample were compounded on a cold mill with 1.0 part by weight of the antioxidant 2,2'-methylene bis(4-methyl-6-tertiary butyl phenol), 1.0 part by weight of stearic acid, 50 parts by weight of HAF carbon black, and 1.0 part by weight of tetramethyl thiuram disulfide. All samples were then tested for Mooney scorch time as in Example VIII and vulcanized at 307° F. for 45 minutes with the following results:

| Property | Control | Sample W | Sample X |
|---|---|---|---|
| Slurrying aid added | None | Calcium oleate | Calcium naphthenate |
| Mooney scorch time (minutes) | 6 | 10 | 9 |
| Modulus at 300% elong. (p.s.i.) | 2,500 | 2,320 | 2,460 |
| Tensile strength (p.s.i.) | 2,500 | 2,520 | 2,645 |
| Elongation (percent) | 300 | 320 | 320 |

The above data show that the scorch resistance of chlorinated butyl rubber is materially improved by the addition of calcium oleate or calcium naphthenate. It will also be noted that the vulcanizates formed were favorably comparable with the control.

Resort may be had to various modifications and variations of the disclosed specific embodiments without departing from the spirit of the invention or the scope of the appended claims.

What is claimed is:

1. In a process for the manufacture of halogenated rubbery copolymers of 85 to 99.5 weight percent of a $C_4$ to $C_8$ isoolefin and about 15 to 0.5 weight percent of a $C_4$ to $C_{14}$ multiolefin, the improvement which comprises contacting the halogenated copolymer with an aqueous medium so as to form an aqueous slurry, said aqueous slurry containing about 0.01 to 10 weight percent based on aqueous medium of a stabilizer consisting of an alkaline earth metal salt of a $C_5$ to $C_{30}$ monocarboxylic fatty acid and drying the stabilized halogenated copolymer formed whereby not only is the aqueous slurry stabilized against agglomeration of halogenated copolymer particles but also the halogenated copolymer is further stabilized against scorching and prevulcanization during drying.

2. In a process for the manufacture of halogenated rubbery copolymers of about 85 to 99.5 weight percent of a $C_4$ to $C_8$ isoolefin and about 15 to 0.5 weight percent of a $C_4$ to $C_{14}$ multiolefin in which the unhalogenated copolymer is formed by copolymerizing the isoolefin and multiolefin at about −80° to −165° C. in the form of a slurry suspended in about 1 to 10 volumes of an alkyl halide diluent, the improvement which comprises contacting said slurry with a $C_5$ to $C_{10}$ hydrocarbon solvent heated to a temperature sufficient to volatilize alkyl halide and dissolve the copolymer therein, halogenating the copolymer while dissolved in the solvent, contacting the resulting solution of dissolved halogenated copolymer at an elevated temperature sufficient to volatilize solvent with an aqueous medium so as to form a slurry, said aqueous medium containing about 0.01 to 10 weight percent based on aqueous medium of a stabilizer consisting of an alkaline earth metal salt of a $C_5$ to $C_{30}$ monocarboxylic fatty acid and drying the stabilized halogenated copolymer formed whereby not only is the aqueous slurry stabilized against agglomeration of halogenated copolymer particles but also the halogenated copolymer is further stabilized against scorching and prevulcanization during drying.

3. A process according to claim 2 in which the stabilizer is barium stearate.

4. A process according to claim 2 in which the stabilizer is barium stearate.

5. A process according to claim 2 in which the stabilizer is magnesium stearate.

6. A process according to claim 2 in which the stabilizer is calcium naphthenate.

7. In a process for the manufacture of halogenated rubbery copolymers of about 85 to 99.5 weight percent of a $C_4$ to $C_8$ issoolefin and about 15 to 0.5 weight percent of a $C_4$ to $C_{14}$ multiolefin in which the unhalogenated copolymer is formed by copolymerizing the isoolefin and multiolefin at about $-80°$ to $-165°$ C. in the form of a slurry suspended in about 1 to 10 volumes of a $C_1$ to $C_3$ alkyl chloride diluent, the improvement which comprises contacting said slurry with a $C_5$ to $C_{10}$ hydrocarbon solvent heated to a temperature sufficient to volatilize alkyl chloride and dissolve the copolymer therein, halogenating the copolymer while dissolved in the solvent, contacting the resulting solution of dissolved halogenated copolymer at a temperature of between about 100° and 200° F. with an aqueous medium so as to volatilize the solvent and form a slurry of halogenated butyl rubber particles in the aqueous medium, said aqueous medium containing about 0.05 to 7.0 weight percent based on aqueous medium of a stabilizer consisting of an alkaline earth metal salt of a $C_{10}$ to $C_{22}$ monocarboxylic fatty acid, said medium being free of zinc salts and calcium silicate and said stabilizer inhibiting agglomeration of copolymer particles, drying the stabilized halogenated copolymer formed, compounding said stabilized halogenated copolymer with curatives and vulcanizing the same, said halogenated copolymer thus further being stabilized against scorching and prevulcanization during drying, compounding, and curing.

8. A process according to claim 7 in which the alkaline earth metal salt of the monocarboxylic fatty acid is selected from the group consisting of calcium, magnesium, and barium naphthenates, oleates, linoleates, ricinoleates, palmitates, stearates and mixtures thereof.

9. A process according to claim 8 in which the isoolefin is isobutylene.

10. A product produced by the process of claim 8 in which the isoolefin is isobutylene.

11. A product produced by the process of claim 8 in which the diolefin is isoprene.

12. A process according to claim 8 in which the aqueous medium also contains about 0.1 to 0.5 weight percent based on copolymer of an antioxidant.

13. A process according to claim 12 in which the stabilizer is calcium oleate.

14. A process according to claim 12 in which the stabilizer is magnesium naphthenate.

15. An aqueous slurry of a halogenated rubbery copolymer of about 85 to 99.5 weight percent of a $C_4$ to $C_8$ isoolefin and about 15 to 0.5 weight percent of a $C_4$ to $C_{14}$ multiolefin, said slurry consisting of, in addition to copolymer and water, about 0.01 to 10 weight percent based on water of a calcium salt of a $C_5$ to $C_{30}$ monocarboxylic fatty acid.

16. A halogenated rubbery copolymer of about 85 to 99.5 weight percent of a $C_4$ to $C_8$ isoolefin and about 15 to 0.5 weight percent of a $C_4$ to $C_{14}$ multiolefin which has been stabilized against scorching and prevulcanization during drying and compounding, said halogenated copolymer containing as the sole additional component a composition consisting of about 0.01 to 10 weight percent based on halogenated butyl rubber of a calcium salt of a $C_5$ to $C_{30}$ monocarboxylic acid which has been added to said rubbery copolymer prior to drying.

17. A stabilized halogenated copolymer according to claim 16 in which the isoolefin is isobutylene, the multiolefin being a $C_4$ to $C_6$ conjugated diolefin, the calcium salt being of a $C_{10}$ to $C_{22}$ monocarboxylic fatty acid which is present in an amount of between about 0.05 and 7.0 weight percent based on halogenated copolymer.

References Cited in the file of this patent

UNITED STATES PATENTS

| | | |
|---|---|---|
| 2,014,504 | Orthner et al. | Sept. 17, 1935 |
| 2,511,605 | Tinsley | June 13, 1950 |
| 2,523,289 | Frolich | Sept. 26, 1950 |
| 2,586,124 | Van Amerongen | Feb. 19, 1952 |
| 2,596,878 | Van Veersen | May 13, 1952 |
| 2,631,984 | Crawford et al. | Mar. 17, 1953 |
| 2,688,004 | Lewis et al. | Aug. 13, 1954 |
| 2,833,734 | Morrissey et al. | May 6, 1958 |

OTHER REFERENCES

D'Ianni et al., I. and E. Chem., pages 1171–1177, vol. 38, No. 11 (November 1946).

Morrissey, I. and E. Chem., pages 1562–1563, vol. 47, No. 8, (August 1955).

UNITED STATES PATENT OFFICE

CERTIFICATION OF CORRECTION

Patent No. 2,958,667 November 1, 1960

Lawrence T. Eby et al.

It is hereby certified that error appears in the above numbered patent requiring correction and that the said Letters Patent should read as corrected below.

Column 9, line 2, for "barium" read -- calcium --.

Signed and sealed this 15th day of August 1961.

(SEAL)
Attest:

ERNEST W. SWIDER
Attesting Officer

DAVID L. LADD
Commissioner of Patents